(12) United States Patent
Yoshihara

(10) Patent No.: US 6,831,434 B2
(45) Date of Patent: Dec. 14, 2004

(54) CONTROL CIRCUIT FOR BRUSHLESS DC MOTOR EQUIPPED WITH PROTECTIVE CIRCUIT

(75) Inventor: Shinichi Yoshihara, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/614,061

(22) Filed: Jul. 8, 2003

(65) Prior Publication Data

US 2004/0056618 A1 Mar. 25, 2004

(30) Foreign Application Priority Data

Sep. 19, 2002 (JP) ........................... 2002-272700

(51) Int. Cl.⁷ ................................................. H02F 7/50
(52) U.S. Cl. ................ 318/439; 318/434; 318/254; 318/286; 324/161
(58) Field of Search ................................ 318/138, 139, 318/434, 439, 28–293, 245, 254, 455, 456, 466

(56) References Cited

U.S. PATENT DOCUMENTS

| | | | | |
|---|---|---|---|---|
| 3,971,981 A | * | 7/1976 | Nakagome et al. ......... | 324/254 |
| 4,240,014 A | * | 12/1980 | Muller ........................ | 388/811 |
| 4,379,366 A | * | 4/1983 | Kuno et al. .................. | 33/361 |
| 4,587,468 A | * | 5/1986 | Hotta .......................... | 318/362 |
| 4,847,555 A | * | 7/1989 | Stammer et al. ............ | 324/161 |
| 4,983,894 A | * | 1/1991 | Oku et al. ................... | 318/138 |
| 5,327,053 A | * | 7/1994 | Mann et al. ................. | 318/254 |
| 5,900,709 A | * | 5/1999 | Kanda et al. ............... | 318/652 |
| 5,982,119 A | * | 11/1999 | Okada et al. ............... | 318/286 |
| 2002/0195981 A1 | * | 12/2002 | Sakai et al. ................. | 318/439 |
| 2004/0000884 A1 | * | 1/2004 | Inao et al. ................... | 318/254 |
| 2004/0108827 A1 | * | 6/2004 | Kusaka et al. .............. | 318/254 |

FOREIGN PATENT DOCUMENTS

JP          5-172584          * 7/1993

* cited by examiner

Primary Examiner—Paul Ip
(74) Attorney, Agent, or Firm—Birch, Stewart, Kolasch & Birch, LLP.

(57) ABSTRACT

In order to prevent stator windings and power amplification semiconductor devices from being damaged by heat when a rotor is locked, a current feed term setting circuit that maintains an output signal circuit of a logical circuit in "OFF" state to completely cut off currents to the stator windings, when the number of repetitions of "ON" and "OFF" states of the output signal circuit reaches a predetermined value, is added to a driving IC of a control circuit for a brushless DC motor equipped with a protective circuit.

2 Claims, 2 Drawing Sheets

CONTROL CIRCUIT FOR BRUSHLESS DC MOTOR EQUIPPED WITH PROTECTIVE CIRCUIT

BACKGROUND OF THE INVENTION

1. Field of the Invention

The present invention concerns a control circuit for a brushless DC motor. More particularly, the present invention concerns a control circuit for a brushless DC motor equipped with a protective circuit.

2. Description of the Prior Art

FIG. 2 shows an example of a circuit diagram of a control circuit for a brushless DC motor equipped with a protective circuit of the prior art.

In FIG. 2, a Hall device 1 detects magnetic pole position of a rotor (not illustrated) having N-S magnetic poles, being rotatably supported and opposing to stators (also not illustrated) with an air-gap between the rotor and the stators. The stators are provided with single phase stator windings 9, 10. Output signal of the Hall device 1 is transmitted to a Hall amplifier 1-1 that amplifies the output signal. A logical circuit 2-1 receives output of the Hall amplifier 1-1 and generates two-phase half wave power supply signals. The two-phase half wave power supply signals are transmitted to power amplification semiconductor devices (power devices) 4, 5. The power amplification semiconductor devices 4, 5 supply currents alternately to a stator winding 9 or to a stator winding 10, connected respectively to the power amplification semiconductor device 4 or to the power amplification semiconductor device 5. Thus the rotor is rotated in a predetermined rotational direction.

A rotation detection circuit 2-3 receives AC signal of the output of the Hall device 1 transmitted from the logical circuit 2-1, and charges or discharges a locking detection capacitor 2-4 according to the AC signal. A comparator 2-5 detects voltage at a not grounded end portion of the locking detection capacitor 2-4. A reset circuit 2-6 makes an output signal circuit of the logical circuit 2-1 "ON" or "OFF" state according to the output of the comparator 2-5, as will be explained later. A combination circuit 2-7 combines outputs of the reset circuit 2-6 and the logical circuit 2-1, and outputs locking detection signal.

Output of the combination circuit 2-7 is connected to an output terminal 3, outputs of the logical circuit 2-1 are respectively connected to output terminals 7, 8, and the not grounded end portion of the locking detection capacitor 2-4 is connected to a terminal 6.

Additionally, a driving IC 2 comprises the Hall amplifier 1-1, the logical circuit 2-1, the rotation detection circuit 2-3, the comparator 2-5, the reset circuit 2-6 and the combination circuit 2-7.

It sometimes happens that a rotor of a brushless DC motor is locked by some cause such as an overload, and the motor stops to rotate. In case that the rotor is locked, since no induced voltage is generated in the stator windings 9, 10, the resistances of the stator windings 9, 10 become the only factors to restrict the currents flowing through the stator windings 9, 10. Accordingly, there is a risk that excessive currents may flow in the stator windings 9, 10 as well as in the power amplification semiconductor devices 4, 5, and that the stator windings 9, 10 and the power amplification semiconductor devices 4, 5 may be damaged by heat.

In the driving IC 2 as explained above, if the rotor is locked, no output signal is transmitted from the Hall device 1, and no AC signal of the output of the Hall device 1 is transmitted from the logical circuit 2-1 to the rotation detection circuit 2-3. Accordingly, the rotation detection circuit 2-3 merely charges the locking detection capacitor 2-4 without discharging it. Therefore, voltage at the not grounded end portion of the locking detection capacitor 2-4 is raised. The comparator 2-5 detects the raised voltage at the not grounded end portion of the locking detection capacitor 2-4, and makes the output signal circuit of the logical circuit 2-1 "OFF" state, through the reset circuit 2-6, to cut off the output signal of the logical circuit 2-1, if the voltage at the not grounded end portion of the locking detection capacitor 2-4 exceeds a predetermined value. Thus, the two-phase half wave power supply signals are not transmitted into the power amplification semiconductor devices 4, 5, and currents are not supplied to the stator windings 9, 10 of the brushless DC motor. Thus the stator windings 9, 10 and the power amplification semiconductor devices 4, 5 can be prevented from being damaged by heat.

After the currents to the stator windings 9,10 having been cut off, the voltage at the not grounded end portion of the locking detection capacitor 2-4 falls due to natural discharge with the passage of time. The comparator 2-5 detects the voltage that has fallen, and makes the output signal circuit of the logical circuit 2-1 "ON" state, through the reset circuit 2-6, to allow the logical circuit 2-1 to transmit the output signal, if the voltage is lower than the predetermined value. Thus, function of the control circuit is automatically reset, currents are fed again to the stator windings 9, 10 of the brushless DC motor, and the motor returns to normal rotation, if the cause of the locking of the rotor has been removed.

However, if the cause of the locking of the rotor has not been removed, no output signal is transmitted from the Hall device 1 since the rotor can not rotate, and no AC signal of the output of the Hall device 1 is transmitted from the logical circuit 2-1 to the rotation detection circuit 2-3. Accordingly, the rotation detection circuit 2-3 merely charges the locking detection capacitor 2-4 without discharging it. Therefore, voltage at the not grounded end portion of the locking detection capacitor 2-4 is again raised. The comparator 2-5 detects the raised voltage at the not grounded end portion of the locking detection capacitor 2-4, and makes the output signal circuit of the logical circuit 2-1 "OFF" state, through the reset circuit 2-6, to cut off the output signal of the logical circuit 2-1, if the voltage exceeds the predetermined value. Thus, the two-phase half wave power supply signals are not transmitted into the power amplification semiconductor devices 4, 5, and currents are not supplied to the stator windings 9, 10 of the brushless DC motor.

Thus, "ON" and "OFF" states of the output signal circuit of the logical circuit 2-1 are repeated, and the stator windings 9, 10 and the power amplification semiconductor devices 4, 5 are prevented from being damages by heat.

Repetition frequency of "ON" and "OFF" states of the output signal circuit of the logical circuit 2-1 can be adjusted by suitably selecting resistance of the rotation detection circuit 2-3 and capacitance of the locking detection capacitor 2-4.

Additionally, the function of the control circuit can be returned to the normal state by removing the cause of the locking of the rotor.

In case that a brushless DC motor is used as a fan motor for cooling of an electronic equipment for example, a control circuit of a small size having a high output power is strongly requested to be used. As a result, since the temperature in a power amplification semiconductor device rises rapidly when the rotor is locked, there is a problem that it is difficult to deal with the problem concerning the raised temperature by adjusting the repetition frequency of "ON" and "OFF" states of the currents in a driving IC.

SUMMARY OF THE INVENTION

It is an object of the present invention to solve the above problem in the prior art and to provide a control circuit for brushless DC motor equipped with protective circuit, that is capable of preventing stator windings and power amplification semiconductor devices from being damaged by heat when a rotor is locked and excessive currents flow through the stator windings, that is small in size, that has high output power, and that is low in cost.

To achieve the above object, a control circuit for brushless DC motor equipped with protective circuit according to a preferred embodiment of the present invention comprises:

a magnetism detector for detecting magnetic pole position of a rotor opposing to stators with an air-gap between the rotor and the stators, the stators being provided with stator windings of a single phase, the rotor being rotatably supported and having N-S magnetic poles;

a logical circuit that receives output signal of the magnetism detector and generates two-phase half wave power supply signals;

power amplification semiconductor devices that amplify the two-phase half wave power supply signals and feed currents to the stator windings to rotate the rotor in a predetermined rotational direction;

a rotation detection circuit that receives AC signal of the output signal of the magnetism detector from the logical circuit and charges or discharges a locking detection capacitor;

a comparator that detects voltage at a not grounded end portion of the locking detection capacitor;

a reset circuit that receives output of the comparator and makes an output signal circuit in the logical circuit "ON" or "OFF" state according to the voltage at the not grounded end portion of the locking detection capacitor;

a combination circuit that compounds outputs of the reset circuit and the logical circuit, and that outputs a locking detection signal; and, a current feed term setting means that maintains the output signal circuit in "OFF" state to completely cut off currents to the stator windings, when the number of repetitions of "ON" and "OFF" states of the output signal circuit of the logical circuit has reached a predetermined value.

Further, according to one embodiment of the present invention, the current feed term setting means comprises:

an AND circuit of which an input terminal is connected to outputs of the logical circuit, and of which another input terminal is connected to the locking detection signal of the combination circuit;

an integration circuit comprising an integration circuit resistor and an integration circuit capacitor, and connected to the output of the AND circuit; and a second comparator that compares voltage at a not grounded end portion of the integration circuit capacitor with a reference voltage, and the output of which is connected to the not grounded end portion of the locking detection capacitor.

In the control circuit for brushless DC motor equipped with protective circuit according to the embodiment of the present invention, the current feed term setting means with simple structure is added to the control circuit of the prior art. So, when the locked state of the rotor still continues to exist, the currents fed to the windings by automatic reset function of the control circuit is completely cut off at the number of repetitions of the "ON" and the "OFF" states of the currents fed to the windings at which temperatures in the stator windings and the power amplification semiconductor devices remain within the allowable temperatures. Accordingly, a control circuit for brushless DC motor equipped with protective circuit, that is capable of preventing the stator windings and the power amplification semiconductor devices from being damaged by heat, that is small in size, that has high output power, and that is low in cost can be provided.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A preferred embodiment of the present invention is explained referring to the attached drawings.

Figure 1:
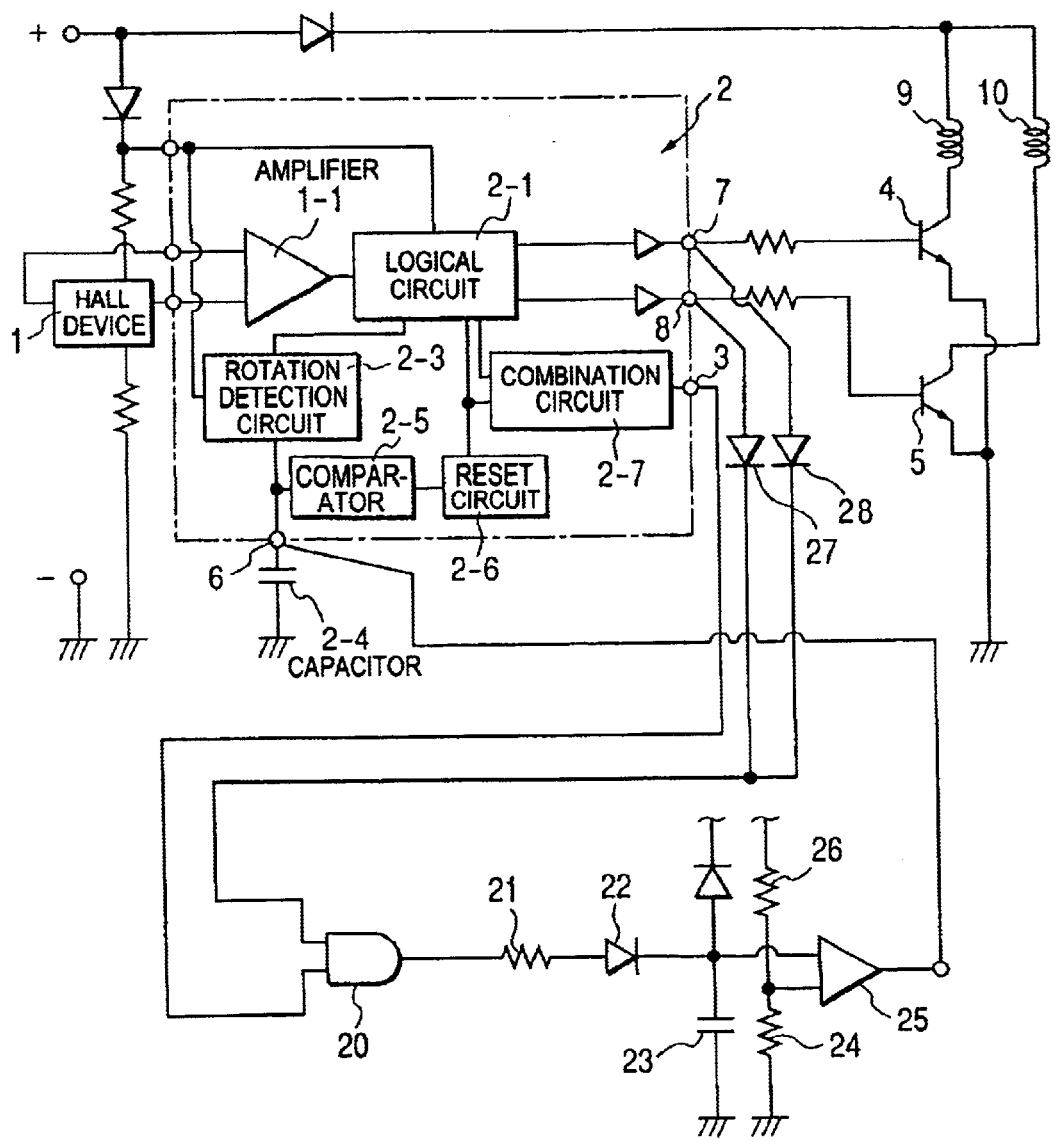
FIG. 1 is a circuit diagram of a control circuit for brushless DC motor equipped with protective circuit according to an embodiment of the present invention.

FIG. 1 shows a circuit diagram of a control circuit for brushless DC motor equipped with protective circuit according to the embodiment of the present invention.

Figure 2:
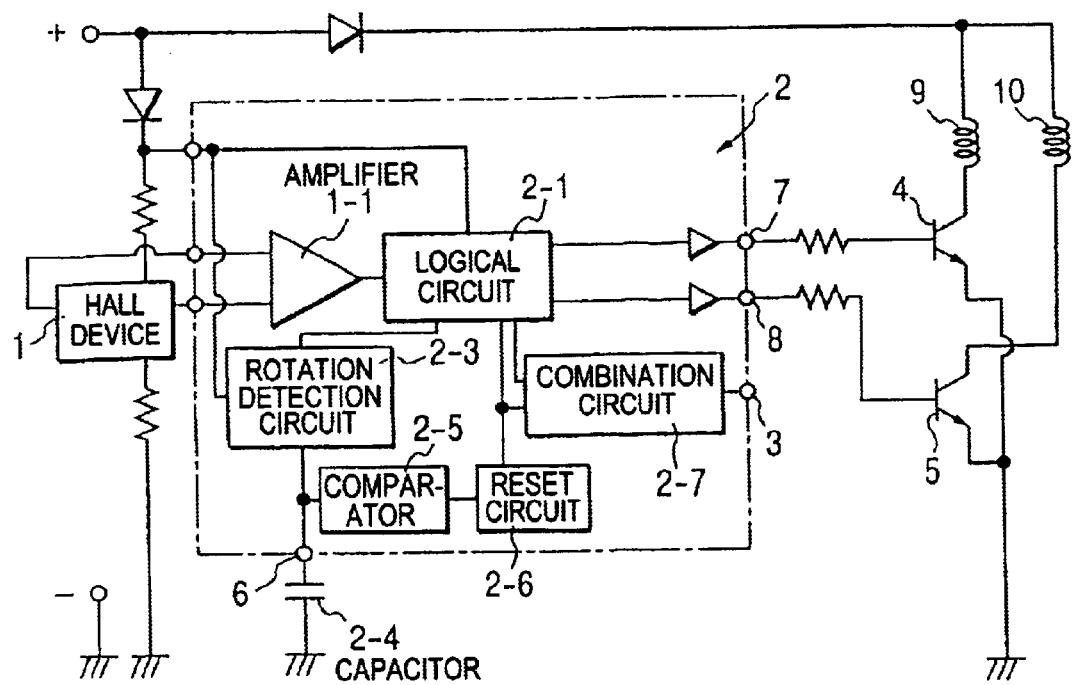
FIG. 2 is a circuit diagram of an example of a control circuit for brushless DC motor equipped with protective circuit of the prior art.

Similarly to that of the prior art shown in FIG. 2, a driving IC 2 shown in FIG. 1 also comprises a Hall amplifier 1-1, a logical circuit 2-1, a rotation detection circuit 2-3, a comparator 2-5, a reset circuit 2-6 and a combination circuit 2-7.

The Hall device 1, that is a magnetism detector, detects magnetic pole position of a rotor (not illustrated) having N-S magnetic poles, being rotatably supported and opposing to stators (also not illustrated) with an air-gap between the rotor and the stators. The stators are provided with single phase stator windings 9, 10. Output signal of the Hall device 1 is transmitted to the Hall amplifier 1-1 that amplifies the output signal. The logical circuit 2-1 receives output of the Hall amplifier 1-1 and generates two-phase half wave power supply signals. The two-phase half wave power supply signals are transmitted to power amplification semiconductor devices (power devices) 4, 5. The power amplification semiconductor devices 4, 5 supply currents alternately to a stator winding 9 or to a stator winding 10, connected respectively to the power amplification semiconductor device 4 or to the power amplification semiconductor device 5. Thus the rotor is rotated in a predetermined rotational direction.

The rotation detection circuit 2-3 receives AC signal of the output signal of the Hall device 1 transmitted from the logical circuit 2-1, and charges or discharges a locking detection capacitor 2-4 according to the AC signal. The comparator 2-5 detects voltage at a not grounded end portion of the locking detection capacitor 2-4. The reset circuit 2-6 makes an output signal circuit of the logical circuit 2-1 "ON"

or "OFF" state according to output of the comparator 2-5, as will be explained later. The combination circuit 2-7 combines outputs of the reset circuit 2-6 and the logical circuit 2-1, and outputs locking detection signal.

Output of the combination circuit 2-7 is connected to an output terminal 3, outputs of the logical circuit 2-1 are respectively connected to output terminals 7, 8, and the not grounded end portion of the locking detection capacitor 2-4 is connected to a terminal 6.

In the driving IC 2 as explained above, if the rotor is locked, no output signal is transmitted from the Hall device 1, and no AC signal of the output of the Hall device 1 is transmitted from the logical circuit 2-1 to the rotation detection circuit 2-3. Accordingly, the rotation detection circuit 2-3 merely charges the locking detection capacitor 2-4 without discharging it. Therefore, voltage at the not grounded end portion of the locking detection capacitor 2-4 is raised.

The comparator 2-5 detects the raised voltage at the not grounded end portion of the locking detection capacitor 2-4, and makes the output signal circuit of the logical circuit 2-1 "OFF" state, through the reset circuit 2-6, to cut off the output signal of the logical circuit 2-1, if the voltage at the not grounded end portion of the locking detection capacitor 2-4 exceeds a predetermined value. Thus, the two-phase half wave power supply signals are not transmitted into the power amplification semiconductor devices 4, 5, and currents are not supplied to the stator windings 9, 10 of the brushless DC motor. Thus, the stator windings 9, 10 and the power amplification semiconductor devices 4, 5 can be prevented from being damaged by heat.

After the currents to the stator windings 9,10 having been cut off, the voltage at the not grounded end portion of the locking detection capacitor 2-4 falls due to natural discharge with the passage of time. The comparator 2-5 detects the voltage that has fallen, and makes the output signal circuit of the logical circuit 2-1 "ON" state, through the reset circuit 2-6, to allow the logical circuit 2-1 to transmit the output signal, if the voltage is lower than the predetermined value. Thus, function of the control circuit is automatically reset, currents are fed again to the stator windings 9, 10 of the brushless DC motor, and the motor returns to normal rotation, if the cause of the locking of the rotor has been removed.

However, if the cause of the locking of the rotor has not been removed, since the rotor can not rotate, no output signal is transmitted from the Hall device 1, and no AC signal of the output of the Hall device 1 is transmitted from the logical circuit 2-1 to the rotation detection circuit 2-3. Accordingly, the rotation detection circuit 2-3 merely charges the locking detection capacitor 2-4 without discharging it. Therefore, voltage at the not grounded end portion of the locking detection capacitor 2-4 is again raised. The comparator 2-5 detects the raised voltage at the not grounded end portion of the locking detection capacitor 2-4, and makes the output signal circuit of the logical circuit 2-1 "OFF" state, through the reset circuit 2-6, to cut off the output signal of the logical circuit 2-1, if the voltage exceeds the predetermined value. Thus, the two-phase half wave power supply signals are not transmitted into the power amplification semiconductor devices 4, 5, and currents are not supplied to the stator windings 9, 10 of the brushless DC motor.

Thus, "ON" and "OFF" states of the output signal circuit of the logical circuit 2-1 are repeated.

In the control circuit for brushless DC motor equipped with protective circuit according to the embodiment of the present invention, a current feed term setting means or a current feed term setting circuit is added to the driving IC 2. The current feed term setting circuit comprises an AND circuit 20, an integration circuit comprising an integration circuit resistor 21 and an integration circuit capacitor 23, and a second comparator 25.

To an input terminal of the AND circuit 20, the output terminals 7 and 8, to which the outputs of the logical circuit 2-1 of the driving IC 2 are respectively connected, are connected through the diode 27 and the diode 28 respectively. To another input terminal of the AND circuit 20, the output terminal 3, to which the output of the combination circuit 2-7 is connected, is connected. Output of the AND circuit 20 is connected, thorough the integration circuit resistor 21 and the diode 22, to a not grounded end portion of the integration circuit capacitor 23. The not grounded end portion of the integration circuit capacitor 23 is connected to an input terminal of the second comparator 25. A reference voltage is connected to another input terminal of the second comparator 25. Additionally, the reference voltage is a voltage at a point at which the resistor 24 and the resistor 26 are connected in series between the power source and the ground. Output of the second comparator 25 is connected to the terminal 6 to which the not grounded end portion of the locking detection capacitor 2-4 of the driving IC 2 is connected.

The current feed term setting circuit thus composed functions as follows.

When a state in which the rotor is locked is successively detected in the driving IC 2, output signals corresponding to "ON" state or "OFF" state are repeatedly output from the output terminals 7, 8 of the driving IC 2. The output signals corresponding to "ON" state or "OFF" state are transmitted into one of the input terminals of the AND circuit 20. Into another input terminal of the AND circuit 20, the locking detection signal indicating that the rotor is being locked is transmitted from the output terminal 3 which is connected to the output of the combination circuit 2-7 of the driving IC 2. Accordingly, positive or negative signals corresponding to the "ON" state or the "OFF" state are output from the AND circuit 20. Since the positive output signals of the AND circuit 20 are transmitted into the integration circuit capacitor 23, through the integration circuit resistor 21 and the diode 22 connected in series, the voltage at the not grounded end portion of the integration circuit capacitor 23 is raised in proportion to the number of occurrences of the output signals corresponding to the "ON" and the "OFF" states. The second comparator 25 compares the voltage at the not grounded end portion of the integration circuit capacitor 23 with the reference voltage set by the resistor 24 and the resistor 26. If the voltage at the not grounded end portion of the integration circuit capacitor 23 exceeds the reference voltage, the second comparator 25 transmits the reference voltage into the terminal 6 to which the not grounded end portion of the locking detection capacitor 2-4 of the driving IC 2 is connected. Accordingly, the voltage at the not grounded end portion of the locking detection capacitor 2-4 becomes to be maintained at the reference voltage. As stated before, if the not grounded end portion of the locking detection capacitor 2-4 of the driving IC 2 exceeds the predetermined value, the output signal of the logical circuit 2-1 is cut off. Therefore, by using the reference voltage as the predetermined value in the comparator 2-5, the state in which the two-phase half wave power supply signals are not transmitted into the power amplification semiconductor devices 4, 5 is maintained. Accordingly, currents are not fed to the stator windings 9, 10 of the brushless DC motor, and the stator windings 9, 10 as well as the power amplification semiconductor devices 4, 5 are prevented from being damaged by heat.

The reference voltage to be set in the second comparator 25 is determined as follows. The relations between voltage at the not grounded end portion of the integration circuit capacitor 23 and the temperatures in the stator windings 9, 10 and the power amplification semiconductor devices 4, 5 are obtained. Then, the reference voltage is determined to be the value below which the temperatures in the stator windings 9, 10 and the power amplification semiconductor devices 4, 5 remain within the allowable values.

Before resuming the currents to the stator windings 9, 10 after the cause of the locking of the rotor has been removed, the power source is cut off and the locking detection capacitor 2-4 is discharged. Then, the control circuit is returned to the initial state capable of feeding the currents.

In the control circuit for brushless DC motor equipped with protective circuit according to the embodiment of the present invention, the current feed term setting circuit with simple structure is added to the control circuit of the prior art. So, when the locked state of the rotor still continues to exist, the currents fed to the windings by automatic reset function of the control circuit is completely cut off at the number of repetitions of the "ON" and the "OFF" states of the currents fed to the windings at which temperatures in the stator windings and the power amplification semiconductor devices remain within the allowable temperatures. Accordingly, a control circuit for brushless DC motor equipped with protective circuit, that is capable of preventing the stator windings and the power amplification semiconductor devices from being damaged by heat, that is small in size, that has high output power, and that is low in cost can be provided.

What is claimed is:

1. A control circuit for brushless DC motor equipped with protective circuit comprising:

a magnetism detector for detecting magnetic pole position of a rotor opposing to stators with an air-gap between said rotor and said stators, said stators being provided with stator windings of a single phase, and said rotor being rotatably supported and having N-S magnetic poles;

a logical circuit that receives output signal of said magnetism detector and generates two-phase half wave power supply signals;

power amplification semiconductor devices that amplify said two-phase half wave power supply signals and feed currents to said stator windings to rotate said rotor in a predetermined rotational direction;

a rotation detection circuit that receives AC signal of said output signal of said magnetism detector from said logical circuit and charges or discharges a locking detection capacitor;

a comparator that detects voltage at a not grounded end portion of said locking detection capacitor;

a reset circuit that receives output of said comparator and makes an output signal circuit in said logical circuit "ON" or "OFF" state according to said voltage of said locking detection capacitor;

a combination circuit that compounds outputs of said reset circuit and said logical circuit, and that outputs a locking detection signal; and a current feed term setting means that maintains said output signal circuit in "OFF" state to completely cut off currents to said stator windings, when the number of repetitions of "ON" and "OFF" states of said output signal circuit of said logical circuit has reached a predetermined value.

2. The control circuit for brushless DC motor equipped with protective circuit according to claim 1, wherein said current feed term setting means comprises:

an AND circuit of which an input terminal is connected to outputs of said logical circuit, and of which another input terminal is connected to said locking detection signal of said combination circuit;

an integration circuit comprising an integration circuit resistor and an integration circuit capacitor, and connected to the output of said AND circuit; and a second comparator that compares voltage at a not grounded end portion of said integration circuit capacitor with a reference voltage, and the output of which is connected to said not grounded end portion of said locking detection capacitor.

* * * * *